US005612401A

United States Patent [19]
Brown et al.

[11] Patent Number: 5,612,401
[45] Date of Patent: Mar. 18, 1997

[54] COMPOSITIONS OF POLY(PHENYLENE ETHER) POLY(ARYLENE SULFIDE) POLYESTER RESINS AND COMPATIBILIZER COMPOUND

[75] Inventors: Sterling B. Brown, Schenectady; Kevin H. Dai, Clifton Park, both of N.Y.; Chorng-Fure R. Hwang, Cary, N.C.; Steven T. Rice, Scotia, N.Y.; James J. Scobbo, Jr., Slingerlands, N.Y.; John B. Yates, Glenmont, N.Y.

[73] Assignee: General Electric Company, Pittsfield, Mass.

[21] Appl. No.: 634,081

[22] Filed: Apr. 17, 1996

Related U.S. Application Data

[63] Continuation of Ser. No. 405,635, Mar. 17, 1995, abandoned.

[51] Int. Cl.$^6$ .............................. C08L 71/12; C08L 81/04; C08L 67/02
[52] U.S. Cl. .............. 524/413; 524/430; 524/447; 524/449; 524/451; 524/456; 524/539; 524/540; 525/64; 525/65; 525/68; 525/92 D; 525/92 F; 525/92 J; 525/109; 525/133; 525/391; 525/396; 525/397; 525/537
[58] Field of Search .................... 525/396, 397, 525/391, 64, 65, 68, 92 D, 109, 133; 524/413, 430, 451, 447, 449, 456, 539

[56] References Cited

U.S. PATENT DOCUMENTS

| | | |
|---|---|---|
| 4,021,596 | 5/1977 | Bailey . |
| 4,451,607 | 5/1984 | Garcia et al. . |
| 4,476,284 | 10/1984 | Clearly . |
| 4,528,346 | 7/1985 | Sugie et al. . |
| 4,704,448 | 11/1987 | Brugel . |
| 4,732,937 | 3/1988 | Sybert ................................ 525/397 |
| 4,889,893 | 12/1989 | Kobayashi et al. . |
| 5,047,465 | 9/1991 | Auerbach . |
| 5,122,578 | 6/1992 | Han et al. . |
| 5,162,433 | 11/1992 | Nishio et al. . |
| 5,231,132 | 7/1993 | Khouri ................................ 525/397 |
| 5,247,006 | 9/1993 | Khouri ................................ 525/397 |
| 5,288,786 | 2/1994 | Nishio ................................ 525/397 |
| 5,290,881 | 3/1994 | Dekkers . |
| 5,292,789 | 3/1994 | Ishida et al. . |

FOREIGN PATENT DOCUMENTS

| | | |
|---|---|---|
| 0104543A1 | 9/1983 | European Pat. Off. . |
| 0225144B1 | 11/1986 | European Pat. Off. . |
| 0228268B1 | 12/1986 | European Pat. Off. . |
| 341421 | 5/1988 | European Pat. Off. ........ 525/396 |
| 341422 | 5/1988 | European Pat. Off. ........ 525/396 |
| 0341421A2 | 4/1989 | European Pat. Off. . |
| 0341422A2 | 4/1989 | European Pat. Off. . |
| 0360544A2 | 9/1989 | European Pat. Off. . |
| 0368413A2 | 11/1989 | European Pat. Off. . |
| 0394933A3 | 4/1990 | European Pat. Off. . |
| 0405135A1 | 5/1990 | European Pat. Off. . |
| 0407216A1 | 7/1990 | European Pat. Off. . |
| 0472960A3 | 8/1990 | European Pat. Off. . |
| 0438777A3 | 12/1990 | European Pat. Off. . |
| 0438051A3 | 1/1991 | European Pat. Off. . |
| 0412572A2 | 2/1991 | European Pat. Off. . |
| 0472913A2 | 7/1991 | European Pat. Off. . |
| 0479560A2 | 10/1991 | European Pat. Off. . |
| 0475038A2 | 3/1992 | European Pat. Off. . |
| 0472960A3 | 9/1992 | European Pat. Off. . |
| 0506006A2 | 9/1992 | European Pat. Off. . |
| 0549977A1 | 12/1992 | European Pat. Off. . |
| 524705-A2 | 1/1993 | European Pat. Off. . |
| 50-156561-A | 12/1975 | Japan . |
| 60-053562-A | 3/1985 | Japan . |
| 61-021156-A | 1/1986 | Japan . |
| 62-65351 | 3/1987 | Japan . |
| 63-97662 | 4/1988 | Japan . |
| 63-205358-A | 8/1988 | Japan . |
| 01031862-A | 2/1989 | Japan . |
| 1-213361 | 8/1989 | Japan . |
| 1-213360 | 8/1989 | Japan . |
| 1-240566 | 9/1989 | Japan . |
| 1-266160 | 10/1989 | Japan . |
| 01259060-A | 10/1989 | Japan . |
| 3-244661 | 2/1990 | Japan . |
| 2-75656 | 3/1990 | Japan . |
| 02155951-A | 6/1990 | Japan . |
| 2-252761 | 11/1990 | Japan . |
| 03126761-A | 5/1991 | Japan . |
| 3-121159 | 5/1991 | Japan . |
| 3-126761 | 5/1991 | Japan . |
| 3-153757 | 7/1991 | Japan . |
| 3205452-A | 9/1991 | Japan . |
| 3-265661 | 11/1991 | Japan . |
| 4-59870 | 2/1992 | Japan . |
| 4-59871 | 2/1992 | Japan . |
| 4096972-A | 3/1992 | Japan . |
| 4-122770 | 4/1992 | Japan . |
| 4-130158 | 5/1992 | Japan . |
| 04132766-A | 5/1992 | Japan . |
| 4-198268 | 7/1992 | Japan . |
| 04211926-A | 8/1992 | Japan . |
| 4-213357 | 8/1992 | Japan . |
| 04213358-A | 8/1992 | Japan . |
| 4-211927 | 8/1992 | Japan . |
| 04259540-A | 9/1992 | Japan . |
| 4264163-A | 9/1992 | Japan . |
| 4-318067 | 11/1992 | Japan . |
| 4-339861 | 11/1992 | Japan . |
| 5098159-A | 4/1993 | Japan . |
| 5170907-A | 7/1993 | Japan . |
| 5320506-A | 12/1993 | Japan . |
| 5339501-A | 12/1993 | Japan . |
| WO92/01749 | 3/1991 | WIPO . |

Primary Examiner—Patricia A. Short

[57] ABSTRACT

Improved compositions are provided which comprise a poly(phenylene ether) resin, a poly(arylene sulfide) resin, a polyester resin, and a compatibilizer compound. The compositions can further comprise functionalizing agents, impact modifiers, flame retardants, and reinforcing fillers to provide compositions that exhibit improved tensile strength and elongation characteristics. Articles molded from these compositions are useful in the electrical connector industry.

15 Claims, No Drawings

COMPOSITIONS OF POLY(PHENYLENE ETHER) POLY(ARYLENE SULFIDE) POLYESTER RESINS AND COMPATIBILIZER COMPOUND

This is a continuation of application Ser. No. 08/405,635 filed on Mar. 17, 1995, now abandoned.

BACKGROUND OF THE INVENTION

1. Field of the Invention

This invention relates to blends of poly(phenylene ether), poly(arylene sulfide), polyester resins and compatibilizer compounds. The blends exhibit enhanced physical properties such as improved tensile strength and elongation.

2. Brief Description of the Related Art

Blends of poly(phenylene ether) resins and poly(arylene sulfide) resins are generally known, but such blends are typically brittle and have poor chemical resistance in the absence of compatibilization between the materials. Accordingly, there have been numerous methods developed for providing compatibilization between the two resins. These methods generally involve functionalizing the poly(phenylene ether) resin, the poly(arylene sulfide) resin, or both, presumably in order to make copolymers between the two resins. The resultant copolymers are thought to serve as compatibilizers for the remaining poly(phenylene ether) resin and poly(arylene sulfide) resin. Examples of various compatibilized blends of poly(phenylene ether) resins and poly(arylene sulfide) resins can be found in U.S. Pat. Nos. 5,290,881, 5,199,578, 5,292,789, and 4,528,346 as well as EP-341422-A, EP-368413-A, EP-491884-A, JP 03121159A, and JP 04213357-A; all of which are incorporated herein by reference.

Accordingly, there is a need to provide compositions of poly(phenylene ether) resins and poly(arylene sulfide) resins which demonstrate enhanced properties such as improved tensile strength and elongation.

SUMMARY OF THE INVENTION

The needs discussed above have been generally satisfied by the surprising discovery of an improved thermoplastic composition which comprises:

a) a poly(phenylene ether) resin;

b) a poly(arylene sulfide) resin c) a polyester resin.

d) a compatibilizer compound.

In preferred embodiments, the compatibilizer compound contains at least two reactive groups selected from the group consisting of epoxy, ortho ester, and mixtures of epoxy and ortho ester. The compositions may additionally comprise functionalizing agents, impact modifiers, fillers, and flame retardants to further enhance the overall properties of the final composition. The description which follows will provide additional details regarding this invention.

DETAILED DESCRIPTION OF THE INVENTION

The poly(phenylene ether) resins (hereinafter known as "PPE") employed in the present invention are known polymers comprising a plurality of structural units of the formula (I)

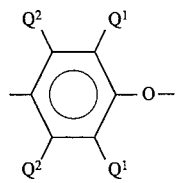

wherein for each structural unit independently, each $Q^1$ is independently halogen, primary or secondary lower alkyl (i.e., alkyl containing up to about 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

Both homopolymer and copolymer PPE are included. The preferred homopolymers are those containing 2,6-dimethyl-1,4-phenylene ether units. Suitable copolymers include random copolymers containing, for example, such units in combination with 2,3,6-trimethyl-1,4-phenylene ether units. Also included are PPE containing moieties prepared by grafting vinyl monomers or polymers such as polystyrenes and elastomers, as well as coupled PPE in which coupling agents such as low molecular weight polycarbonates, quinones, heterocycles and formals undergo reaction in known manner with the hydroxy groups of two PPE chains to produce a higher molecular weight polymer.

The PPE generally have a number average molecular weight within the range of about 3,000–40,000 and a weight average molecular weight within the range of about 20,000–80,000, as determined by gel permeation chromatography. Its intrinsic viscosity is most often in the range of about 0.15–0.6 dl./g., as measured in chloroform at 25° C.

The PPE are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful PPE for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the PPE contemplated for use in the present invention include all those presently known, irrespective of variations in structural units or ancillary chemical features.

For one embodiment of the present invention, it is preferred for at least some of the PPE to be functionalized. Functionalized PPE are those PPE which contain at least one reactive functional group, which may be present on a polymer endgroup or along the backbone of the polymer chain.

One way to functionalize the PPE is by reacting the PPE with at least one olefinic compound used as a functionalizing agent. Typical reagents used to accomplish this functionalization include maleic anhydride, fumaric acid, cinnamic acid, maleimides such as N-phenylmaleimide and 1,4-phenylene-bis-methylene-α,α'-bismaleimide, maleic hydrazide, methylnadic anhydride, fatty oils (e.g., soybean oil, tung oil, linseed oil, sesame oil), unsaturated carboxylic acids such as acrylic, crotonic, methacrylic acid and oleic acid, unsaturated alcohols such as allyl alcohol and crotyl alcohol and unsaturated amines such as allylamine and trialkyl amine salts of unsaturated acids such as triethylammonium fumarate and tri-n-butylammonium fumarate. Such typical reagents for preparing a useful functionalized PPE are described in U.S. Pat. Nos. 4,315,086, 4,755,566, and 4,888, 397, which are incorporated herein by reference.

It is sometimes advantageous to use an initiator in the reaction of the functionalized PPE with the olefinic compound. Suitable initiators for use in the current invention include free radical initiators generally known to the art. Specific initiators include various peroxides and hydroperoxides. Specific examples include benzoyl peroxide, 2,5-dimethyl-2,5-di(t-butylperoxy)hexane, dicumyl peroxide, 2,5-dimethyl2,5-di(t-butylperoxy)hexyne-3 and cumene peroxide, with 2,5,-dimethyl2,5-di(t-butylperoxy)hexyne-3 being preferred. When it is used, the amount of initiator used can vary from about 0.05 weight percent to about 0.5 weight percent relative to the weight of the PPE.

Non-polymeric aliphatic polycarboxylic acids are also useful for preparing a functionalized PPE. Typical of this group of functionalizers are the aliphatic polycarboxylic acids, acid esters and acid amides represented by the formula (II):

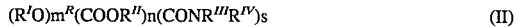

$$(R'O)_m R(COOR'')_n(CONR'''R^{IV})_s \qquad (II)$$

wherein R is a linear or branched chain, saturated aliphatic hydrocarbon from 2 to 20, preferably from 2 to 10, carbon atoms; $R'$ is selected from the group consisting of hydrogen or an alkyl, aryl, acyl or carbonyl dioxy group from 1 to 10, preferably from 1 to 6, most preferably from 1 to 4, carbon atoms, especially preferred is hydrogen; each $R''$ is independently selected from the group consisting of hydrogen or an alkyl or aryl group from 1 to 20 carbon atoms, preferably from 1 to 10 carbon atoms; each $R'''$ and $R^{IV}$ is independently selected from the group consisting essentially of hydrogen or an alkyl or aryl group from 1 to 10, preferably from 1 to 6, most preferably from 1 to 4, carbon atoms; m is equal to 1 and (n+s) is greater than or equal to 2, preferably equal to 2 or 3, and n and s are each greater than or equal to zero and wherein $(OR')$ is alpha or beta to a carbonyl group and at least two carbonyl groups are separated by 2 to 6 carbon atoms. Obviously, $R', R'', R'''$ and $R^{IV}$ cannot be aryl when the respective substituent has less than 6 carbon atoms.

Illustrative of suitable polycarboxylic acids are citric acid, malic acid, and agaricic acid; including the various commercial forms thereof, such as, for example, the anhydrous and hydrated acids. Illustrative of acid esters useful herein include, for example, acetyl citrate and mono- and/or distearyl citrates and the like. Suitable acid amides useful herein include for example N,N'- diethyl citric acid amide; N,N'-dipropyl citric acid amide; N-phenyl citric acid amide; N-dodecyl citric acid amide; N,N'-didodecyl citric acid amide and N-dodecyl malic acid amide. Derivatives of the foregoing polycarboxylic acids are also suitable for use in the practice of the present invention. Suitable functionalizing compounds can be found in U.S. Pat. Nos. 4,315,086, 4,755,566 and 5,000,897, which are incorporated herein by reference.

The amount of the above mentioned functionalizing agent that is required to appropriately functionalize the PPE is that which is sufficient to improve the compatibility between the various components in the composition. An effective amount, based on the amount of the PPE, is generally up to about 8% by weight, and is preferably from about 0.05% to about 4% by weight. In the most preferred embodiments, the amount of the functionalizing agent is in the range from about 0.1% to about 3% by weight based on the amount of the PPE.

In the preparation of a functionalized PPE, it is also sometimes advantageous to employ at least one lubricant which is substantially inert to the functionalizing agent and any other ingredients. The presence of the lubricant decreases the required melt processing temperature to produce the functionalized PPE, as well as the compatibilized blends prepared therefrom. As a result of the decreased melt temperature, gel formation is minimized.

Suitable lubricants will be apparent to those skilled in the art; in general, they are solids with high lubricity or relatively low melting solids or oils. Examples include polytetrafluoroethylene, fatty acid amides as disclosed and claimed in copending, commonly owned application Ser. No. 07/815211 (abandoned), aluminum alkylphosphonates as disclosed and claimed in copending, commonly owned application Ser. No. 07/816629, U.S. Pat. No. 5,376,714, and hydrogenated poly(α-olefins) as disclosed and claimed in copending, commonly owned application Ser No. 07/816430 (abandoned) and commonly owned U.S. Pat. Nos. 5,214,099 and 5,281,667, which are incorporated herein by reference.

The hydrogenated poly(α-olefins) are often preferred. They may be obtained by the catalytic polymerization of α-olefins followed by hydrogenation to remove residual unsaturation. The catalysts which may be employed in their preparation include cationic and metathetic catalysts. Methods for preparing hydrogenated poly(α-olefins) are disclosed, for example, in U.S. Pat. Nos. 4,225,739, 4,282,392, 4,311,864, 4,319,065, 4,334,113 and 4,409,415, all of which are incorporated herein by reference. The products comprise polymers of various molecular weights, including oligomers.

The most preferred hydrogenated poly(α-olefins) are those having kinematic viscosities of about 2–20 centistokes and especially 8–12 centistokes at 100° C., as determined by ASTM procedure D445. They are commercially available from such companies as Henkel Corporation under the tradename EMERY fluids.

The hydrogenated poly(α-olefins) are generally used in a lubricating amount. The lubricating amount, based on the weight of the PPE, is generally in the range of about 1% to about 5% by weight and preferably about 2% to about 4 % by weight.

Another useful method for preparing appropriate functionalized PPE involves reacting PPE with a compound containing an acyl functional group in a non-reactive solvent for PPE. The reacted (capped) PPE may be isolated by conventional techniques, such as precipitation with a non-solvent. Non-limiting examples of these compounds include chloroformyl succinic anhydride, chloroethanoyl succinic anhydride, trimellitic anhydride acid chloride, 1-acetoxyacetyl-3,4-dibenzoic acid anhydride, and terephthalic acid acid chloride. Additional examples and methods to prepare such functionalized PPE can be found in U.S. Pat. Nos. 4,600,741 and 4,642,358, each of which is incorporated herein by reference.

The poly(arylene sulfide) resins (referred to hereinafter as "PPS") used in the present invention are derived from the known polymers containing arylene groups separated by sulfur atoms. The preferred poly(arylene sulfide) resins include various poly(phenylene sulfide)s, for example, poly(p-phenylene sulfide) and substituted poly(phenylene sulfide)s. Typical PPS polymers comprise at least 70 molar %, preferably at least 90 molar %, of recurring units of the following structural formula (III):

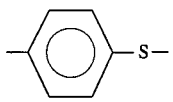  (III)

When the amount of said recurring units is less than 70 molar %, the heat resistance may be somewhat reduced.

The other 30 molar % or less, and preferably 10 molar % or less, of the recurring units of PPS can be those of the following structural formulae (IV):

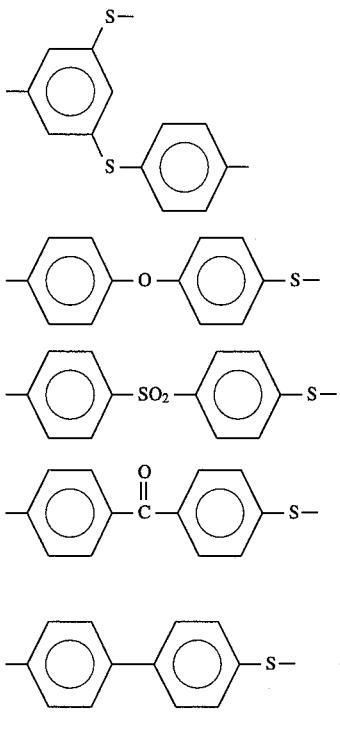  (IV)

wherein $R^{21}$, $R^{22}$, $R^{23}$ and $R^{24}$ are independently selected from the group consisting of hydrogen, halogen, alkyl, phenyl, alkoxy, aryloxy, nitro, amino, and carboxy groups.

The PPS of the present invention may be linear, branched, or cured polymers, or mixtures of the same. Linear PPS of relatively low molecular weight may be prepared by, for example, a process disclosed in the specification of U.S. Pat. No. 3,354,129, which is incorporated herein by reference. Linear PPS having a relatively high molecular weight may be prepared by, for example, the process disclosed in the specification of U.S. Pat. No. 3,919,177, which is incorporated herein by reference. Branched PPS may be prepared by the use of a branching agent, for example, 1,3,5-trichlorobenzene, which is disclosed in U.S. Pat. No. 4,749,163 and which is incorporated herein by reference. The degree of polymerization of the polymers prepared by the processes of U.S. Pat. Nos. 3,354,129, 3,919,177 and 4,749,163 can be further increased by curing in an oxygen atmosphere or in the presence of a crosslinking agent such as, for example, a peroxide after polymerization.

The PPS may be functionalized or unfunctionalized. If the PPS is functionalized, the functional groups may include, but are not limited to, amino, carboxylic acid, metal carboxylate, disulfide, thio, and metal thiolate groups. One method for incorporation of functional groups into PPS can be found in U.S. Pat. No. 4,769,424, which is incorporated herein by reference, which discloses incorporation of substituted thiophenols into halogen substituted PPS. Another method involves incorporation of chlorosubstituted aromatic compounds containing the desired functionality reacted with an alkali metal sulfide and chloroaromatic compounds. A third method involves reaction of PPS with a disulfide containing the desired functional groups, typically in the melt or in a suitable high boiling solvent such as chloronaphthalene.

The PPS, more specifically, the poly(p-phenylene sulfide) resin, preferably has moieties which will react with an electrophilic species (i.e., ortho ester and epoxy). Suitable reactive groups for the PPS include, for example, amine, thiophenol and acid groups.

Though the melt viscosity of PPS used in the present invention is not particularly limited so far as the blends which can be obtained, a melt viscosity of at least about 100 Poise is preferred from the viewpoint of the toughness of PPS per se and that of about 10,000 Poise or less is preferred from the viewpoint of the injection moldability.

The PPS in this invention may also be treated to remove unwanted contaminating ions by immersing the resin in deionized water or by treatment with an acid, typically hydrochloric acid, sulfuric acid, phosphoric acid or acetic acid as found in Japanese Kokai Nos. 3,236,930-A, 1,774, 562-A, 1,299,872-A and 3,236,931-A, all of which are incorporated herein by reference. For some product applications, it is preferred to have a very low impurity level in the PPS. The impurity level is usually represented as the percent by weight ash remaining after burning a PPS sample. Typically ash contents of the PPS of less than about 1% by weight are desirable, with ash numbers less than about 0.5% by weight preferred and ash numbers less than about 0.1% by weight most preferred.

Polyesters suitable for preparing the present compositions include those comprising structural units of the formula (V):

  (V)

wherein each $R^{41}$ is independently a divalent aliphatic hydrocarbon, alicyclic hydrocarbon, aromatic hydrocarbon, polyoxyalkylene radical, or mixtures thereof and each $A^1$ is independently a divalent aliphatic, alicyclic or aromatic radical, or mixtures thereof. Examples of suitable polyesters containing the structure of formula (V) are poly(alkylene dicarboxylates), elastomeric polyesters, liquid crystalline polyesters, polyarylates, and polyester copolymers such as copolyestercarbonates. It is also possible to use a branched polyester in which a branching agent, for example, a glycol having three or more hydroxyl groups or a trifunctional or multifunctional carboxylic acid has been incorporated. Treatment of the polyester with a trifunctional or multifunctional epoxy compound, for example, triglycidyl isocyanurate can also be used to make a branched polyester. Furthermore, treatment of the polyester with a multifunctional epoxy compound, for example, a diepoxy compound is also useful for maintaining the molecular weight of the polyester during melt processing the composition. It is also sometimes desirable to have various concentrations of acid and hydroxyl endgroups on the polyester, depending on the ultimate end-use of the composition.

In some instances, it is desirable to reduce the number of acid endgroups, typically to less than about 30 micro equivalents per gram, with the use of acid reactive species. In other instances, it is desirable that the polyester has a relatively high carboxylic end group concentration, e.g., about 5–250 micro equivalents per gram or, more preferable, about 20–70 micro equivalents per gram.

The $R^{41}$ radical may be, for example, a $C_{2-10}$ alkylene radical, a $C_{6-10}$ alicyclic radical, a $C_{6-20}$ aromatic radical or a polyoxyalkylene radical in which the alkylene groups contain about 2–6 and most often 2 or 4 carbon atoms. The $A^1$ radical in the above formula (V) is most often p- or m-phenylene or a mixture thereof. As previously noted, this class of polyester includes the poly(alkylene terephthalates) and the polyarylates. Such polyesters are known in the art as illustrated by the following U.S. Patents, which are incorporated herein by reference.

| | | | |
|---|---|---|---|
| 2,465,319 | 2,720,502 | 2,727,881 | 2,822,348 |
| 3,047,539 | 3,671,487 | 3,953,394 | 4,128,526 |

The poly(alkylene terephthalates), for example, poly(ethylene terephthalate) (commonly abbreviated as "PET"), poly(cyclohexylenedimethanol terephthalate) (commonly abbreviated as "PCT"), and poly(butylene terephthalate) (commonly abbreviated as "PBT") are often the preferred polyesters for the present invention, with poly(ethylene terephthalate) (PET) being the most preferred member. Various mixtures of PET, PCT and PBT are also sometimes very suitable.

The polyester may include structural units of the formula (VI):

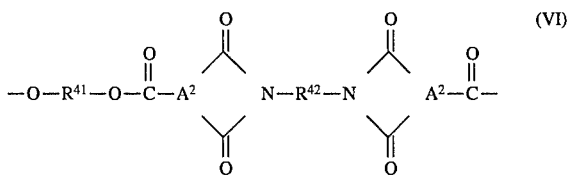

wherein $R^{41}$ is as previously defined for FIG. V. $R^{42}$ is a polyoxyalkylene radical and $A^2$ is a trivalent aromatic radical, usually derived from trimellitic acid and has the structure (VII):

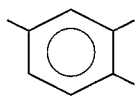 (VII)

Such polymers and their mode of preparation are described for example in U.S. Pat. No. 4,544,734, 4,556,705, and 4,556,688, which are all incorporated herein by reference.

Because of the tendency of polyesters to undergo hydrolytic degradation at the high extrusion and molding temperatures encountered by the compositions of this invention, it is preferred that the polyester be substantially free of water. The polyester may be predried before admixing with the other ingredients. More commonly, the polyester is used without predrying and the volatile materials are removed through the use of vacuum venting the extruder.

The polyesters generally have number average molecular weights in the range of about 20,000–70,000, as determined by intrinsic viscosity (I.V.) at 86° F. in a 60:40 by weight mixture of phenol and 1,1,2,2-tetrachloroethane.

Compatibilizing agents for the PPE, PPS and polyester resins are another element of the present invention. Suitable compatibilizing agents include those compounds which contain groups capable of reacting with the PPE, PPS, and the polyester resins. Examples of useful reactive groups include, for example, epoxy and orthoester groups. Preferred compatibilizing agents include compounds containing multiple orthoesters, epoxy resins and polyolefinic compounds that contain the aforementioned groups. The preferred compatibilizing agents comprise on average at least two electrophilic groups capable of reacting with groups contained on the PPE, PPS, and the polyester resin per molecule, although the average number of reactive groups may be less than 2 per molecule (e.g., the compatibilizing agent may be a mixture of reactive compounds having a variety of reactive groups per molecule). It is also possible for the compatibilizing agent to contain more than one type of reactive species.

Thus, according to one embodiment of the invention, the compatibilizer is added in an amount effective to provide a thermoplastic resin composition which exhibits improved compatibility over the same composition without a compatibilizer. Compatibility is meant to include the minimization of gross phase separation between the components of the blend. Indicators of improved compatibilization include, for example, increased tensile properties, reduced delamination tendency, increased ductility and improved phase morphology stabilisation. It is through the effect of improving the compatibility of the blend components which determines, in part, the desirable physical properties of the blend.

By the term "ortho ester" is meant a compound in which one carbon atom is attached to another by a direct carbon-carbon bond and to three further carbon atoms through oxygen. The orthoester may be characterized by the structure (VIII):

$$-C(OR^6)_3 \qquad (VIII)$$

wherein, $R^6$ is a hydrocarbon radical, usually a $C_{1-4}$ primary or secondary alkyl radical. The $R^6$ radicals may the same or different and may even be connected together to form various cyclic structures. The ortho esters can be considered to be esters of the hypothetical orthoacids $R-C(OH)_3$, wherein R is an organic radical. The existence of such orthoacids is for the most part unknown, since they immediately dehydrate to conventional carboxylic acids. However, esters of such acids are known and the compositions of this invention include certain polymer substituted esters of this type.

An example of a bis(orthoester) useful as a compatibilizing agent is represented by the formula (IX):

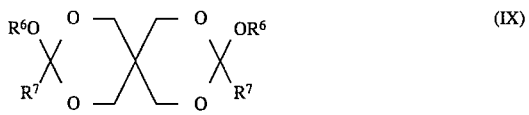 (IX)

wherein $R^6$ is as described for FIG. (VII) and $R^7$ is preferably a $C_{1-4}$ primary or secondary alkyl, $C_{6-10}$ aromatic radical, or $R^6$ and $R^7$ are connected to form a 5- or 6-member ring. The terephthalate bis(ortho ester) derived from the reaction of terephthaloyl chloride with 4-hydroxymethyl-2-methoxy-2-methyl-1,3-dioxolane is also useful as a compatibilizing agent.

Polyolefins and polyolefin copolymers containing orthoester groups are useful as compatibilizing agents. The orthoester functional polyolefins or polyolefin copolymers, preferably contain orthoester moieties represented by the formula (X):

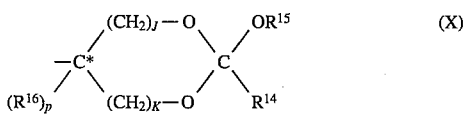

where $R^{15}$ is a $C_{1-4}$ primary or secondary alkyl radical or is an alkylene radical forming a second 5- or 6-member ring with $C^*$; $R^{14}$ is a $C_{1-4}$ primary or secondary alkyl or $C_{6-10}$ aromatic radical, or $R^{14}$ and $R^{15}$ together with the atoms connecting them form a $R^{16}$ is hydrogen or $C_{1-4}$ primary or secondary alkyl; K is 0 or 1;J is from 1 to 2-K; and p is 0 when $R^{15}$ and $C^*$ form a ring and is otherwise 1.

The $R^{15}$ radical may be a $C_{1-4}$ primary or secondary alkyl radical such as methyl, ethyl, n-propyl, isopropyl, n-butyl, isobutyl or secondary butyl. Primary radicals and especially the methyl radical are generally preferred.

It is also possible for $R^{15}$ to form a second 5- or 6-member ring with other portions of the molecule. For or this purpose, one of the carbon atoms in the orthoester ring is designated $C^*$ to indicate its role as part of said second ring.

The $R^{14}$ value may be a $C_{1-4}$ primary or secondary alkyl radical as defined above for $R^{15}$ or a $C^{6-10}$ aromatic (preferably aromatic hydrocarbon) radical. Finally, it is possible for $R^{14}$ and $R^{15}$ together to form a 5-, 6- or 7-member ring with the atoms connecting them.

The $R^{16}$ radical may be hydrogen or an alkyl radical similar to $R^{14}$ and $R^{15}$. It is preferably hydrogen.

The values of J and K depend on whether the cyclic orthoester moiety is a 5-member or 6-member ting. In general, 5-member rings are preferred; that is, K is 0 and J is 1. However, the invention also includes compositions in which a 6-member ring is present, which requires either that J and K both be I or that K be 0 and J be 2.

The value of the subscript p also depends on the cyclic structure of the orthoester moiety. If $C^*$ is part of a ring structure with $R^{15}$, all four valences thereof are satisfied and p will be 0. If this is not the case, p will be 1.

The following is an illustrative orthoester moiety (XI) which may be present in an orthoester functionalized compatibilizer:

and which may also be referred to as a 4-(2-methoxy-2-methyl-1,3-dioxolanyl) radical and is usually preferred. Intermediates for preparation of such compounds include 4-hydroxymethyl-2- methoxy-2-methyl-1,3-dioxolane, which is obtainable by the reaction of glycerol and methyl orthoacetate. An improved method for the preparation of this and structurally related compounds in substantially pure form and the products thus obtained are disclosed in U.S. Pat. No. 5,231,197, which is incorporated herein by reference. The following illustrative orthoester moiety (XII) may be present in the orthoester functional compatibilizer:

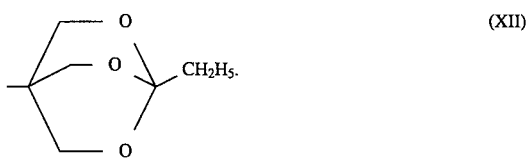

The above moiety may be referred to as a 4-(1-methyl-2,6,7-trioxabicyclo[2.2.2]octyl) radical; the methylol derivative thereof can be prepared by the reaction of ethyl orthoacetate with a substantially equimolar amount of pentaerythritol.

Methods to make the orthoester modified polyolefins can be found in U.S. Pat. Nos. 5,153,290 and 5,132,361, both of which are incorporated herein by reference.

The compatibilizer compound is typically a liquid or solid epoxy or ortho ester compound. Compatibilizer compounds having a molecular weight from about 100 to about 10,000 are preferred. As previously discussed, the preferred compatibilizer compounds comprise at least two reactive groups per molecule, although the average reactive number may be less than 2 per molecule (e.g., the compatibilizer compound may be a mixture of reactive compounds having a variety of reactive groups per molecule). Two or more ortho ester moieties represented by formula (X) or epoxy groups can generally be linked by most any group that is stable to the processing conditions for the PPE composition and is not reactive with the ortho ester and epoxy moieties. Illustrative examples of useful linking groups include: alkyl, cycloalkyl, aryl, esters, amides, heteroaryls such as, for example, triazines, pyridines, pyrimidines, furans, etc., phosphoryl, sulfonyl, dialkylsilicon, and the like. Additional examples of ortho ester or epoxy compounds useful in this invention include: ortho ester and epoxy derivatives of bisphenols such as bisphenol A, resorcinol, hydroquinone, pyrocatechol, bisphenol F, tetrabromobisphenol A, phenol novolaks, o-cresol novolaks, polypropylene glycol, hydrogenated bisphenol A, saligenin, 1,3,5-trihydroxybenzene, 4,4'-dihydroxybiphenyl, 1,5-dihydroxynaphthalene, cashew phenol, dihydroxydiphenylsulfone and 2,2,5,5,-tetrakis(4-hydroxyphenyl)hexane; glycidyl ethers of halogenated bisphenols, glycidyl ethers such as a diglycidyl ether of butanediol; glycidyl esters such as glycidyl phthalate, glycidylamines such as N,N-diglycidylaniline; linear epoxy resins such as epoxidized polyolefins and epoxidized soybean oils; cyclic epoxy resins such as vinyl cyclohexane dioxide and dicyclopentadiene dioxide; glycidyl esters of hexahydrophthalic anhydride, dimer acids; glycidyl amine epoxy resins derived from diaminodiphenylmethane, isocyanuric acid, hydantoin; mixed epoxy resins derived from p-aminophenol, p-oxybenzoic acid; salicylic epoxy resins and novolak phenol-type resins; ortho ester and epoxy derivatives of halogenated bisphenols; ortho esters such as a bis-ortho ester ether of butanediol; compounds such as bis-ortho ester phthalates made from the reaction of glycerol ortho ester and phthaloyl chloride and mixed species such as the epoxy ortho ester phthalate made by the reaction of glycerol ortho ester, glydicol, and phthaloyl chloride. The epoxy and ortho ester compounds can also contain other groups that are reactive with the PPE, PPS, the polyester, or all three. The compatibilizer compounds may be used singly or as mixtures of two or more.

Compatibilizers may also include polymers containing ortho ester-functional groups, epoxy-functional groups, and mixtures of epoxy and ortho ester-functional groups. Examples of such ortho ester substituted polymers include, for example, ortho ester-functional polystyrene and polyolefins (i.e., polyethylene and polypropylene), ortho ester-functional elastomers such as EPR, EPDM, and styrene based block copolymers, ortho ester-functional polysiloxanes, ortho ester-functional polycarbonates, polyimides and polyetherimides, ortho ester-functional polyalkylene glycols and similar ortho ester substituted polymers.

The novolak phenol-type epoxy resins are sometimes preferred. Novolak phenol resins include those obtained by the condensation reaction of phenols and formaldehyde. The novolak phenol-type epoxy resins usually are obtained by reacting novolak-type phenolic resins with epichlorohydrin to give structures schematically illustrated by formula (XIII):

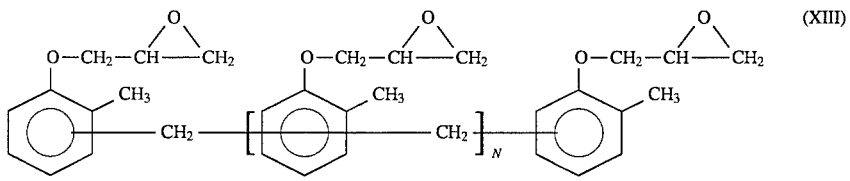 (XIII)

wherein N is 0 or more and typically from 0 to about 5.

The epoxy cresol novolaks are available from Ciba-Geigy as ECN 1235 (average value for N=0.7), ECN 1273 (average value for N=2.8) and ECN 1299 or ECN 9495 (average value for N=3.4).

There is no particular restriction on the starting phenols, but suitable phenols include phenol, o-cresol, m-cresol, p-cresol, bisphenol A, resorcinol, p-tertiary butyl phenol, bisphenol F, bisphenol S, and mixtures of these.

Polyolefin and polyolefin copolymers comprising epoxy groups are also useful as compatibilizing agents. Examples of such olefinic compounds include, for example, copolymers of an α-olefin with a glycidyl ester of an α,β-unsaturated carboxylic acid. α-Olefin as used herein means ethylene, propylene, butene-1, etc. Among them, ethylene is preferred. The glycidyl esters of the α,β-unsaturated acids are compounds of the general formula (XIV):

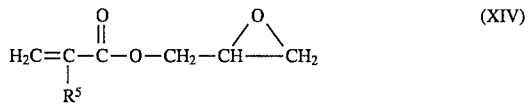 (XIV)

wherein $R^5$ represents a hydrogen atom or a lower alkyl group. Examples of the glycidyl esters of α,β-unsaturated acids include glycidyl acrylate, glycidyl methacrylate and glycidyl ethacrylate. The epoxy-functional polyolefin is preferably an olefinic copolymer containing about 60% to about 99.5% by weight of an α-olefin and about 0.5% to about 40% by weight, preferably about 3% to about 30% by weight, of a glycidyl ester of an α,β-unsaturated carboxylic acid. When the amount of glycidyl ester is less than about 0.5% by weight, little or no discernible effects are observed. To the contrary, when it exceeds about 40% by weight, gelation occurs during melt-blending with the compatibilizing PPE to damage the extrusion stability, moldability and mechanical properties of the product. It is also possible to blend the functional polyolefin with various non-functionalized polyolefins such as, for example, linear low density polyethylene (commonly abbreviated "LLDPE"), polypropylene and ethylene-propylene copolymers.

Suitable copolymers or terpolymers for the epoxy-functional polyolefin include, for example, ethylene-glycidyl acrylate copolymers, ethylene-glycidyl methacrylate copolymers, ethylene-glycidyl methacrylate-vinyl acetate terpolymers, ethylene-glycidyl methacrylate-methyl acrylate terpolymers, ethylene-ethyl acrylate-glycidyl methacrylate terpolymers. The preferred epoxy-functional polyolefins are available from Sumitomo Chemical Co., Ltd. under the trademarks IGETABOND and BONDFAST and from Elf Atochem under the trademark LOTADER.

The compatibilizer compound is used in an amount effective to improve the physical properties, for example, the tensile strength and elongation, of the composition. The amount of the compatibilizer compound is typically in the range from about 0.1 weight percent to about 15 weight percent based on the weight of the entire composition.

It is possible to obtain compositions that have a marked improvement in chemical resistance to common automotive solvents by combining a PPE and at least one compatibilizer compound with the PPS and polyester resin, over comparative compositions comprising unfunctionalized PPE. Thus, according to another embodiment of the invention, a PPE is used in combination with at least one compatibilizer compound, PPS, and polyester resin to obtain superior chemical resistance.

Addition of an effective amount of at least one compatibilizer compound having at least two reactive groups to the PPE/PPS compositions comprising a polyester resin, optionally in combination with a reinforcing filler, led to the surprisingly discovery that the resulting compositions had a unique combination of beneficial properties, such as, for example, increased ductility and tensile properties. Additionally, by combining the above components in effective amounts, it is possible to create a resin composition with no flash capabilities when the resin is injection molded. The term "no flash" resin composition is intended to include not only those compositions which exhibit no flash, but also those compositions which exhibit substantially no flash characteristics.

Thus, according to one embodiment of the invention, the compatibilizer compound is added in an amount effective to provide a thermoplastic resin composition which exhibits improved physical properties, such as improved tensile properties or no flash capabilities over the same composition without a compatibilizer compound.

The invention also includes compositions containing elastomeric impact modifiers compatible with any or all of the PPE, PPS, and the polyester resin.

Impact modifiers for PPE, PPS and polyester resins are typically derived from one or more monomers selected from the group consisting of olefins, vinyl aromatic monomers, acrylic and alkylacrylic acids and their ester derivatives as well as conjugated dienes. Especially preferred impact modifiers are the rubbery high molecular weight materials including natural and synthetic polymeric materials showing elasticity at room temperature. They include both homopolymers and copolymers, including random, block, radial block, graft and core-shell copolymers as well as combinations thereof. The impact modifier may also be functionalized.

Olefin polymers and copolymers employable in the invention include low density polyethylene (LDPE), high density polyethylene (HDPE), linear low density polyethylene (LLDPE), isotactic polypropylene, poly(1-butene), poly(4-methyl-1-pentene), and the like. Additional olefin copolymers include copolymers of one or more α-olefins, particularly ethylene, with copolymerizable monomers including, for example, vinyl acetate, acrylic acids and alkylacrylic acids as well as the ester derivatives thereof including, for example, ethyl acrylate, methacrylic acid, methyl methacrylate and the like. Also suitable are the ionomer resins, which may be wholly or partially neutralized with metal ions.

A particularly useful class of impact modifiers are those derived from the vinyl aromatic monomers. These include AB and ABA type block, tapered and radial block copolymers and vinyl aromatic-conjugated diene core-shell graft copolymers.

An especially preferred subclass of vinyl aromatic monomer-derived resins is the block copolymers comprising monoalkenyl arene (usually styrene) blocks and conjugated diene (e.g., butadiene or isoprene) or olefin (e.g., ethylene-propylene, ethylene-butylene) blocks and represented as AB and ABA block copolymers. The conjugated diene blocks may be partially or entirely hydrogenated, whereupon the properties are similar to the olefin block copolymers.

Suitable AB type block copolymers are disclosed in, for example, U.S. Pat. Nos. 3,078,254, 3,402,159, 3,297,793, 3,265,765 and 3,594,452 and U.K. Pat. 1,264,741, all incorporated herein by reference. Examples of typical species of AB block copolymers include polystyrene-polybutadiene (SBR), polystyrene-poly(ethylenepropylene), polystyrene-polyisoprene and poly($\alpha$-methylstyrene)-polybutadiene. Such AB block copolymers are available commercially from a number of sources, including Phillips Petroleum under the trademark SOLPRENE, Shell Chemical Co. under the trademark KRATON, and Kuraray under the trademark SEPTON.

Additionally, ABA triblock copolymers and processes for their production as well as hydrogenation, if desired, are disclosed in U.S. Pat. Nos. 3,149,182, 3,231,635, 3,462,162, 3,287,333, 3,595,942, 3,694,523 and 3,842,029, which are all incorporated herein by reference.

Examples of triblock copolymers include polystyrene-polybutadiene-polystyrene (SBS), polystyrene-polyisoprene-polystyrene (SIS), poly($\alpha$-methyl-styrene)-polybutadiene-poly($\alpha$-methylstyrene) and poly($\alpha$-methylstyrene)-polyisoprene-poly($\alpha$-methylstyrene). Particularly preferred triblock copolymers are available commercially from Shell Chemical Co. under the trademarks CARIFLEX and KRATON and Kuraray under the trademark SEPTON.

Another class of useful impact modifiers is derived from conjugated dienes. While many copolymers containing conjugated dienes have been discussed above, additional conjugated diene modifier resins include, for example, homopolymers and copolymers of one or more conjugated dienes including, for example, polybutadiene, butadiene-styrene copolymers, isoprene-isobutylene copolymers, chlorobutadiene polymers, butadiene-acrylonitrile copolymers, polyisoprene, and the like. Ethylene-propylene-diene monomer rubbers (EPDM's) may also be used. They are typified as comprising predominantly ethylene units, a moderate amount of propylene units and up to about 20 mole percent of non-conjugated diene monomer units. They may also contain reactive groups such as acid, oxazoline, ortho-ester, epoxy, amine, or anhydride. Many EPDM's and processes for the production thereof are disclosed in U.S. Pat. Nos. 2,933,480, 3,000,866, 3,407,158, 3,093,621 and 3,379,701, which are all incorporated herein by reference.

Other suitable impact modifiers are the core-shell type graft copolymers. In general, these have a predominantly conjugated diene rubbery core or a predominantly cross-linked acrylate rubbery core and one or more shells polymerized thereon and derived from monoalkylarene and/or acrylic monomers alone or, preferably, in combination with other vinyl monomers. The shells of these impact modifiers may also contain reactive groups, for example, acid, epoxy, oxazoline, ortho-ester, amine, or anhydride groups. The core-shell copolymers are widely available commercially in pellet and powder forms, for example, from Rohm and Haas Company as grades including EXL-3330, EXL-3691, EXL-2600, EXL-2607, EXL-2647, EXL-3386, and EXL3607, and are described in U.S. Pat. Nos. 3,808,180, 4,034,013, 4,096,202, 4,180,494 and 4,292,233.

Also useful are the core-shell copolymers wherein an interpenetrating network of the resins employed characterizes the interface between the core and shell. Especially preferred in this regard are the ASA type copolymers available from GE Plastics under the tradename GELOY resin, and described in U.S. Pat. No. 3,944,631.

In addition, there may be employed the above-described polymers and copolymers having copolymerized therewith or grafted thereon monomers having functional groups and/or polar or active groups. The epoxy functional $\alpha$-olefin elastomers previously described are an example of this type of useful impact modifier. Finally, other suitable impact modifiers include Thiokol rubber, polysulfide rubber, polyurethane rubber, polyether rubber (e.g., polypropylene oxide), epichlorohydrin rubber, thermoplastic polyester elastomers and thermoplastic poly(ether-ester) and poly(ester-amide) elastomers.

The proportion of impact modifier or other resinous material is subject to wide variation. The amount of impact modifier used is generally an amount sufficient to improve the ductility of the compositions. Impact modifiers such as diblock or triblock copolymers, when utilized, are usually present in an amount up to about 50 parts per 100 parts of PPE. The epoxy functional olefinic elastomers, when utilized as an impact modifier, are usually present in an amount up to about 50 parts per 100 parts of the total of PPS and polyester resin. Other impact modifiers may also be present and mixtures of various impact modifiers may also be utilized.

When an epoxy compound is utilized, the polymer mixture according to the invention may also comprise a non-elastomeric metal salt having a melting temperature lower than the compounding temperature of the polymer mixture with the exception of metal sails of dihydrocarbyldithiophosphinic acid. It is of importance for the melting temperature of the metal salt to be lower than the compounding temperature of the polymer mixture; when the melting temperature is equal to or higher than the compounding temperature, the metal salt is less effective for improving the mechanical properties. The compounding temperature is the temperature at which the constituents of the polymer mixture according to the invention are mixed to a more or less homogeneous mass in the melted condition or a similar condition. The compounding temperature generally is above about 285° C., usually between approximately 300° and 350° C.

Suitable metal salts are inorganic or organic sails, more preferably metal salts of organic acids. Suitable organic acids are saturated and unsaturated aliphatic carboxylic acids, aromatic carboxylic acids, aliphatic and aromatic sulphonic or phosphonic acids and sails of alkyl hydrogen sulphates. The organic part of the sails preferably has a molecular weight below about 500, more preferably below about 300.

Specific organic acids include, but are not restricted to: benzoic, palmitic, lauric, acetic, stearic, gluconic, as well as dodecyl benzene sulphonic acids.

Suitable metal salts may be taken from a broad range of metals provided that the salt has a melting temperature lower than the polymer mixture compounding temperature. Metals such as calcium, aluminum and zinc are preferred but this does not preclude metals such as sodium, lithium, potassium, barium, beryllium, magnesium, copper, cobalt, and iron. In particular, metal salts of stearic acid are preferred. The amount of metal salt, when utilized, is advantageously from about 0.05 weight percent to about 5 weight percent based on the total weight of the composition.

The addition of reinforcing fillers is also contemplated for the compositions of the present invention. Suitable reinforcing fillers are those which increase the rigidity of the blend composition. Amongst these, fibrous materials are preferred, in particular glass fibers made from low alkali E-glass, having a fiber diameter from about 8 μm to about 14 μm. The length of the glass fibers in the finished molded part is typically, for example, from about 0.01 mm to about 0.5 mm. The glass fibers may be employed as rovings or as chopped or milled glass fibers, and may be provided with a suitable finish and an adhesion promoter or promoter system based on silanes. The amount of reinforcing fillers is advantageously from about 5 weight percent to about 60 weight percent, especially from about 10 weight percent to about 40 weight percent based on the total weight of the composition.

Other fibrous reinforcing materials, e.g. carbon fibers, potassium titanate single-crystal fibers, gypsum fibers, wollastonite, aluminum oxide fibers or asbestos may also be utilized. Non-fibrous fillers, e.g. glass beads, hollow glass beads, talcs, micas, chalks, quartzes and natural or calcined kaolins are further preferred fillers, as are combinations of these materials with glass fibers. Like the glass fibers, these latter fillers may be provided with a finish and/or an adhesion promoter or adhesion promoter system. The combination of a non-fibrous filler that also has a platey structure, e.g. talcs, micas and platey kaolins, with glass fibers is especially preferred for some applications to reduce the anisotropic properties of the final composition due to alignment of the glass fiber with the direction of the mold filling during processing. The amount of non-fibrous filler can range from 0% to about 50% by weight based on the total weight of the entire composition.

The compositions of the present invention may also contain at least one polymer of an alkenylaromatic compound. Suitable polymers of this type may be prepared by methods known in the art including bulk, suspension and emulsion polymerization. They generally contain at least about 25% by weight of structural units derived from an alkenylaromatic monomer of the formula (XV)

wherein $R^{45}$ is hydrogen, lower alkyl or halogen; Y is hydrogen, vinyl, halogen or lower alkyl; and f is from 0 to 5. These resins include homopolymers of styrene, chlorostyrene and vinyltoluene, random copolymers of styrene with one or more monomers illustrated by acrylonitrile, butadiene, α-methylstyrene, ethylvinylbenzene, divinylbenzene and maleic anhydride, and rubber-modified polystyrenes comprising blends and grafts, wherein the rubber is a polybutadiene or a rubbery copolymer of about 98–65% styrene and about 2–35% diene monomer. These rubber modified polystyrenes include high impact polystyrene (commonly referred to as "HIPS"). Non-elastomeric block copolymer compositions of styrene and butadiene can also be used that have linear block, radial block and tapered block copolymer architectures. They are commercially available from such companies as Fina Oil as under the trademark FINACLEAR resins and from Phillips Engineering Resins under the trademark K-RESINS.

The alkenylaromatic compound when present is generally used in the range from about 1% to about 25% by weight and preferably from about 5% to about 15% by weight; based on the weight of the total composition.

The compositional ratios of the present invention can vary widely depending on the desired ultimate end use requirements. At high levels of any one component, that component becomes the continuous phase and the overall blend takes on the major characteristics of that component with some modification from the remaining components. For example, when PPS is used in an amount sufficient that the PPS is the continuous phase, the composition will have good chemical resistance and good flow, two properties generally found with PPS. However, when the PPE is added in an amount sufficient that the PPE becomes the continuous phase, enhanced ductility and high heat will become more pronounced. As intermediate levels of the components are utilized, the properties of the composition develop into a blend of those of the individual components. For example, as the polyester resin is added in an amount sufficient to be the continuous phase, when PPE is added to polyester, the heat resistance of the polyester blend will be increased with increasing levels of the PPE. As PPS is added to the binary blend, flow and chemical resistance are increased. For further improvements, at least one compatibilizer compound is added in an amount sufficient to enhance the physical properties such as tensile strength.

The compositional ratios of the present invention all, except the functional/zing agent, of which are expressed as percentages by weight of the total composition, can range from a level from about 5% to about 94% by weight of PPE resin, about 5% to about 94% by weight of PPS, and about 1% to about 90% by weight of polyester resin, and up to about 15% by weight of at least one compatibilizer compound. The composition may further comprise up to about 8% by weight of a functionalizing agent based on the weight of the PPE; up to about 20% by weight of elastomeric block copolymer, up to about 25% by weight of alkenyl aromatic polymer and up to about 5% by weight of the metal salt.

The composition preferably comprises PPE at a level, expressed as percentages by weight of the total composition, from about 5% to about 94% by weight, more preferably between about 25% to about 40% by weight, and most preferably from about 30% to about 35% by weigh. The composition preferably comprises the PPS at a level, expressed as percentages by weight of the total composition, from about 5% to about 94% by weight, more preferably from about 40% to about 65% by weight, and most preferably from about 50% to about 60% by weight. The composition preferably comprises the polyester resin at a level, expressed as percentages by weight of the total composition, from about 1% to about 90% by weight, more preferably from about 1% to about 25% by weight, and most preferably from about 2% to about 15% by weight. The composition preferably comprises the compatibilizer compound at a level from about 0.1% to about 8% by weight based on the total weight of the composition. The composition preferably comprises the functionalizing agent at a level, expressed as percentages by weight of the PPE, up to about 8% by weight, more preferably from about 0.05% to about 4% by weight, and most preferably from about 0.1% to about 3% by weight. When the epoxy functional elastomer is utilized as an impact modifier, either in addition to another compatibilizer compound or alone, it is preferably present at a level, expressed as percentages by weight of the total composition, of about 2% to about 18% by weight, more preferably from about 5% to about 15% by weight, and most preferably from about 7% to about 12% by weight. The composition preferably comprises the elastomeric block copolymer at a level, expressed as percentages by weight of the total composition, from about 2% to about 18% by weight, more preferably from about 3% to about 10% by weight, and most preferably from about 4% to about 7% by weight. The metal salt is preferably present at a level, expressed as percentages by weight of the total composition, from about 0.05% to about 5% by weight, more preferably present at a level from about 0.1% to about 1% by weight, and most preferably present at a level from about 0.1% to about 0.3% by weight. Preferably PPS and PPE are in a weight ratio of between about 75:25 and about 30:70, more preferably between about 70:30 and about 50:50, and most preferably between about 70:30 and about 60:40. Preferably the epoxy functional elastomer and the elastomeric block copolymer are in the composition in a weight ratio of between about 15:2 and about 5:10, more preferably between about 12:3 and about 6:6,, and most preferably between about 10:6 and about 7:5. Preferably the combined total weight percent, expressed as percentages by weight of the total composition, of epoxy functional elastomer and elastomeric block copolymer in the composition is between about 5% and about 21% by weight, more preferably between about 8% and about 16% by weight, and most preferably between about 10% and about 14% by weight, Preferably the composition is free of additional resin materials such as polyimides, polyamides and polycarbonate resins. Determination of an exact ratio for a composition is, in part, determined by the intended ultimate end-use application of the composition and the necessary properties needed for the application.

The present compositions exhibit improvements in tensile strength and elongation, two properties which are critical for many electronic part applications. The compositions further exhibit no flash characteristics and high chemical resistance. Other advantageous properties exhibited by the present compositions include low coefficient of thermal expansion, low moisture absorption, high heat distortion temperature and long term heat stability.

The compositions may contain or be free of conventional additives such as plasticizers, pigments, dyes, lubricants, mold release agents, stabilizers, antioxidants, or crystallization nucleants.

Preparation of the compositions of the present invention is normally achieved by melt blending the ingredients under conditions for the formation of an intimate blend. Such conditions often include mixing in single or twin screw type extruders or similar mixing devices which can apply a shear to the components. It is often advantageous to apply a vacuum to the melt through a vent port in the extruder to remove volatile impurities in the composition. The compositions of the present invention are useful for making molded articles such as housings for electrical connectors in under-the-hood automotive applications, and are useful for making various other molded articles.

EXAMPLES

The compositions of Table 1 were extruded on a Welding-Engineers twin-screw extruder at a temperature of about 275°–300° C with a vacuum of 10–20 inches Hg applied to the melt during compounding. The resultant compositions were molded using a Engel injection molding machine using a temperature set of about 290°–300° C. and a mold temperature of about 110°–130° C. All the compositions were tested for tensile yield and tensile elongation at break according to ASTM D638.

The actual extrusion conditions employed may affect the physical properties of the resultant blend. In a preferred embodiment of the present invention it is advantageous to premix the PPE with the functionalizing agent to form a functionalized PPE. The functionalized PPE can then be mixed with the remaining ingredients to form the final composition. By functionalizing the PPE before adding the compatibilizer compound it is thought that reaction of the functionalizing agent with the compatibilizer compound can be avoided until after the desired reaction between the functionalizing agent and the PPE can be achieved. Premixing the PPE with the functionalizing agent before mixing with the compatibilizer compound also maximizes the utilization of the functionalizing agent to functionalize the PPE. The preparation of the functionalized PPE can be accomplished in several ways. In one embodiment of the present invention, a functionalized PPE is made by intimately admixing the functionalizing agent with the PPE without the compatibilizer compound present in a separate processing step. In a subsequent processing step any remaining ingredients, including the compatibilizer compound, are intimately admixed. In another embodiment, a single extruder that has at least two ports for introduction of ingredients is utilized. The PPE and the functionalizing agent are introduced into the throat of the extruder (first port) and compounded. Simultaneously, additional ingredients are introduced into ports downstream of the first port and the compounding continued. Each portion of the extruder is preferably vacuum vented. Typical compounding temperatures are in the range from about 275°–340° C.

The materials used in the following examples were as follows:

PPE is poly(2,6-dimethylphenylene ether) resin having an intrinsic viscosity of about 0.46 dl/gm measured in chloroform at 25° C., obtained from GE Plastics.

PPE-CA is a nucleophile-containing PPE prepared by extruding 3% by weight citric acid with PPE. The PPE-CA was further treated by dissolving in toluene and precipitating with methanol and dried at about 110° C. prior to use.

PPS-1 is a cured PPS.

PPS-2 is a branched PPS.

PBT is poly(butylene terephthalate) obtained from GE Plastics as Valox 315.

EPOXY is an epoxy novolak sold by Ciba-Geigy as ECN 9495.

TABLE 1

| sample | PPS-1 | PPS-2 | PPE | PPE-CA | PBT | EPOXY | TEN. STR[a] | TE[b] |
|---|---|---|---|---|---|---|---|---|
| 1 | 275 | 0 | 162.5 | 0 | 0 | 0 | 6602 | 4.0 |
| 2 | 275 | 0 | 0 | 162.5 | 0 | 0 | 7241 | 4.1 |
| 3 | 275 | 0 | 0 | 162.5 | 0 | 17.5 | 8285 | 4.4 |
| 4 | 250 | 0 | 0 | 162.5 | 25 | 0 | 5941 | 3.4 |
| 5 | 225 | 0 | 0 | 162.5 | 56 | 0 | 6755 | 4.0 |
| 6 | 250 | 0 | 0 | 162.5 | 25 | 17.5 | 9144 | 5.2 |
| 7 | 225 | 0 | 0 | 162.5 | 50 | 17.5 | 9584 | 6.0 |
| 8 | 275 | 0 | 162.5 | 0 | 0 | 0 | 9468 | 5.5 |

TABLE 1-continued

| sample | PPS-1 | PPS-2 | PPE | PPE-CA | PBT | EPOXY | TEN. STR[a] | TE[b] |
|---|---|---|---|---|---|---|---|---|
| 9 | 275 | 0 | 162.5 | 0 | 25 | 17.5 | 10360 | 6.7 |
| 10 | 275 | 0 | 162.5 | 0 | 50 | 17.5 | 10420 | 7.2 |
| 11 | 275 | 0 | 0 | 162.5 | 25 | 17.5 | 10860 | 7.7 |
| 12 | 225 | 0 | 0 | 162.5 | 50 | 17.5 | 10380 | 7.4 |
| 13 | 0 | 275 | 0 | 162.5 | 0 | 0 | 7691 | 4.9 |
| 14 | 0 | 250 | 0 | 162.5 | 25 | 0 | 7340 | 4.7 |
| 15 | 0 | 225 | 0 | 162.5 | 50 | 0 | 6710 | 4.4 |
| 16 | 0 | 275 | 0 | 162.5 | 0 | 17.5 | 8480 | 5.4 |
| 17 | 0 | 250 | 0 | 162.5 | 25 | 17.5 | 8537 | 5.4 |
| 18 | 0 | 225 | 0 | 162.5 | 50 | 17.5 | 8907 | 6.0 |

[a] tensile strength at break in psi
[b] tensile elongation at break in percentage Table 1 illustrates the improvement in tensile properties noted with the addition of a compatibilizer compound to compositions comprising PPE, PPS and polyester resin. Sample 1 is a PPE/PPS utilizing a cured PPS and an unfunctionalized PPE. Comparison of Sample 1 to Sample 2 made with a functionalized PPE demonstrates the enhanced tensile strength and elongation noted with the use of functionalized PPE. Sample 3 contains a functionalized PPE and an compatibilizer compound added in an effective amount to increase the tensile strength and elongation over Samples 1 and 2.

Samples 4 and 5 contain functionalized PPE and a cured PPS and a polyester resin. Samples 4 and 5 were free of visible signs of delamination. Both samples required less pressure upon injection molding over Samples 1 to 3. Comparison of Samples 6 and 7 to Samples 4 and 5 illustrates the improvements in tensile properties with the addition of a compatibilizer compound to compositions containing functionalized PPE, cured PPS and polyester resin.

Samples 8 to 12 were run in a separate series from the other compositions in the table. Sample 8 is a duplicate composition to sample 1 except that a different lot of PPS was used. The difference in properties demonstrates the importance of comparing control samples within a particular series when analyzing data. As seen by the data, blends comprising PPS, polyester, a compatibilizer compound and PPE or functionalized PPE have enhanced ductility, as noted by increased tensile properties.

Samples 13 to 18 are a separate series from Samples 1 to 12 and were made with a branched PPS in place of the linear PPS of the prior samples. As with the cured PPS compositions, enhanced properties are obtained with the addition of a polyester resin to compositions comprising PPS, a functionalized PPE and a compatibilizer.

The samples in Table 1 are intended to illustrate the present invention and are not intended to limit the compositions that may be obtained by further optimization for specific property profiles.

We claim:

1. A composition comprising:
   (a) a poly(phenylene ether) resin;
   (b) a poly(arylene sulfide) resin;
   (c) a polyester resin; and
   (d) a compatibilizer compound comprising at least two reactive groups selected from the group consisting of ortho ester, epoxy, or mixtures of ortho ester and epoxy, and wherein the poly(arylene sulfide) resin is present in a sufficient amount to be the continuous phase and wherein the polyester resin is present in an effective amount to provide a composition which exhibits increased tensile strength and tensile elongation over the same composition without the polyester resin.

2. The composition of claim 1, wherein, based on the total weight of the composition, the poly(phenylene ether) resin is present at a level from about 25% to about 40% by weight; the poly(arylene sulfide) resin is present at a level from about 40% to about 65% by weight; and the polyester resin is present at a level from about 1% to about 25% by weight.

3. The composition of claim 2, wherein, based on the total weight of the composition, the poly(phenylene ether) resin is present at a level from about 30% to about 35% by weight; the poly(arylene sulfide) resin is present at a level from about 50% to about 60% by weight; and the polyester resin is present at a level from about 2% to about 15% by weight.

4. The composition of claim 2, further comprising at least one functionalizing agent in amount up to about 8% by weight based on the weight of the poly(phenylene ether) resin.

5. The composition of claim 4, wherein the functionalizing agent is selected from the group consisting of functionalized olefinic compounds and non-polymeric polycarboxylic acids.

6. The composition of claim 4, further comprising at least one reinforcing filler present at a level from about 2% to about 50% by weight based on the total weight of the composition.

7. The composition of claim 4, wherein the reinforcing filler is selected from the group consisting of glass fibers, carbon fibers, potassium titanate single crystal fibers, aluminum oxide fibers, glass beads, hollow glass beads, wollastonites, talcs, micas, chalks, quartzes, natural kaolins, calcined kaolins, and mixtures thereof.

8. The composition according to claim 4, further comprising an impact modifier present at a level from about 2% to about 20% by weight based on the total weight of the composition.

9. The composition of claim 8, wherein the impact modifier is selected from the group consisting of:
   (i) block copolymers of alkenyl aromatic compounds and dienes;
   (ii) epoxy functional α-olefin elastomers; and
   (iii) a mixture of (i) and (ii).

10. The composition of claim 9, wherein the block copolymer is a triblock copolymer.

11. The composition of claim 10, wherein the block copolymer comprises polystyrene endblocks and a selectively hydrogenated diene-derived midblock.

12. The composition of claim 4, further comprising at least one alkenyl aromatic polymer.

13. An article made from a composition comprising:
(a) a poly(phenylene ether) resin;
(b) a poly(arylene sulfide) resin;
(c) a polyester resin; and
(d) a compatibilizer compound comprising at least two reactive groups selected from the group consisting of ortho ester, epoxy, or mixtures of ortho ester and epoxy, and wherein the poly(arylene sulfide) resin is present in a sufficient amount to be the continuous phase and wherein the polyester resin is present in an effective amount to provide a composition which exhibits increased tensile strength and tensile elongation over the same composition without the polyester resin.

14. A method for making a composition comprising: intimately admixing a poly(phenylene ether) resin, a poly(arylene sulfide) resin, a polyester resin, and a compatibilizer compound comprising at least two reactive groups selected from the group consisting of ortho ester, epoxy, or mixtures of ortho ester and epoxy, wherein the poly(arylene sulfide) resin is present in a sufficient amount to be the continuous phase and wherein the polyester resin is present in an effective amount to provide a composition which exhibits increased tensile strength and tensile elongation over the same composition without the polyester resin.

15. A composition consisting essentially of:
(a) a functionalized poly(phenylene ether) resin;
(b) a poly(arylene sulfide) resin;
(c) a polyester resin; and
(d) a compatibilizer compound comprising at least two reactive groups selected from the group consisting of ortho ester, epoxy, or mixtures of ortho ester and epoxy, and wherein the poly(arylene sulfide) resin is present in a sufficient amount to be the continuous phase and wherein the polyester resin is present in an effective amount to provide a composition which exhibits increased tensile strength and tensile elongation over the same composition without the polyester resin.

* * * * *